US007847803B1

(12) United States Patent
Van Hook (10) Patent No.: US 7,847,803 B1
(45) Date of Patent: Dec. 7, 2010

(54) METHOD AND APPARATUS FOR INTERLEAVED GRAPHICS PROCESSING (75) Inventor: Timothy J. Van Hook, Atherton, CA (US)

(73) Assignee: ATI Technologies ULC (CA)

( * ) Notice: Subject to any disclaimer, the term of this patent is extended or adjusted under 35 U.S.C. 154(b) by 255 days.

(21) Appl. No.: 09/625,812

(22) Filed: Jul. 26, 2000

(51) Int. Cl.
G09G 5/36 (2006.01)
G06F 9/46 (2006.01)

(52) U.S. Cl. .......................... 345/559; 718/107; 718/102

(58) Field of Classification Search .................. 345/505, 345/560, 422, 606, 426, 501, 506, 502, 530, 345/559; 712/2, 32, 207, 229, 235, 202, 712/214, 220, 216; 717/149, 124; 709/105; 718/107, 102, 100
See application file for complete search history.

(56) References Cited

U.S. PATENT DOCUMENTS

| 5,115,513 | A | * | 5/1992 | Nemirovsky et al. | 712/36 |
| 5,261,063 | A | * | 11/1993 | Kohn et al. | 712/229 |
| 5,357,617 | A | * | 10/1994 | Davis et al. | 712/245 |
| 5,710,912 | A | * | 1/1998 | Schlansker et al. | 712/220 |
| 5,768,594 | A | * | 6/1998 | Blelloch et al. | 717/149 |
| 5,778,250 | A | * | 7/1998 | Dye | 712/32 |
| 5,961,628 | A | * | 10/1999 | Nguyen et al. | 712/2 |
| 5,973,705 | A | * | 10/1999 | Narayanaswami | 345/505 |
| 6,061,710 | A | * | 5/2000 | Eickemeyer et al. | 718/107 |
| 6,161,173 | A | * | 12/2000 | Krishna et al. | 712/214 |
| 6,209,083 | B1 | * | 3/2001 | Naini et al. | 712/229 |
| 6,223,276 | B1 | * | 4/2001 | Lee et al. | 712/207 |
| 6,330,584 | B1 | * | 12/2001 | Joffe et al. | 718/107 |
| 6,341,347 | B1 | * | 1/2002 | Joy et al. | 712/228 |
| 6,493,820 | B2 | * | 12/2002 | Akkary et al. | 712/235 |

* cited by examiner

Primary Examiner—Joni Hsu
(74) Attorney, Agent, or Firm—Vedder Price, P.C.

(57) ABSTRACT

The present invention provides for programmable interleaved graphics processing. The invention provides an execution pipeline and a number of registers. Each register holds instructions from a separate program. Instructions from the registers are interleaved in the execution pipeline such that the average latency is one instruction per cycle. This is accomplished even when there is conditional branching and execution latency. When one instruction has a dependency based on execution of a previous instruction, that second instruction is not provided to the execution pipeline until completion of the first instruction. However, in the meantime interleaved instructions from other programs are still being executed while the first instruction of the first program is executing. Thus the pipeline is always full and the processor is always working at peak capacity. The automatic interleaving of instructions permits simplified graphics software routines to be written. There is no need for the programmer or developer to anticipate or attempt to eliminate conditional branching or to worry about instruction latency. The design of the programmable interleaved graphics processing system provides a solution to those problems.

7 Claims, 5 Drawing Sheets

METHOD AND APPARATUS FOR INTERLEAVED GRAPHICS PROCESSING

BACKGROUND

1. Field of the Invention

This invention relates to the field of graphics processing.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

2. Background

Computer systems are often used to display generate and display graphics on a display. Display images are made up of thousands of tiny dots, where each dot is one of thousands or millions of colors. These dots are known as picture elements, or "pixels". Each pixel has a color, with the color of each pixel being represented by a number value stored in the computer system.

A three dimensional display image, although displayed using a two dimensional array of pixels, may in fact be created by rendering of a plurality of graphical objects. Examples of graphical objects include points, lines, polygons, and three dimensional solid objects. Points, lines, and polygons represent rendering "primitives" which are the basis for most rendering instructions. More complex structures, such as three dimensional objects, are formed from a combination or mesh of such primitives. To display a particular scene, the visible primitives associated with the scene are drawn individually by determining those pixels that fall within the edges of the primitive, and obtaining the attributes of the primitive that correspond to each of those pixels. The obtained attributes are used to determine the displayed color values of applicable pixels.

Sometimes, a three dimensional display image is formed from overlapping primitives or surfaces. A blending function based on an opacity value associated with each pixel of each primitive is used to blend the colors of overlapping surfaces or layers when the top surface is not completely opaque. The final displayed color of an individual pixel may thus be a blend of colors from multiple surfaces or layers.

In some cases, graphical data is rendered by executing instructions from an application that is drawing data to a display. During image rendering, three dimensional data is processed into a two dimensional image suitable for display. The three dimensional image data represents attributes such as color, opacity, texture, depth, and perspective information. The draw commands from a program drawing to the display may include, for example, X and Y coordinates for the vertices of the primitive, as well as some attribute parameters for the primitive, and a drawing command. The execution of drawing commands to generate a display image is known as graphics processing.

The prior art has provided two solutions to accomplish graphics processing. One solution is to build special processing hardware to provide high speed graphics processing capability. The other is to provide programmable graphics processing by executing graphics processing software on a general purpose processing platform. Both prior art solutions have drawbacks that limit their flexibility and performance.

Hardware solutions typically provide special purpose hardware that implements hardwired graphics processing algorithms that can provide very fast processing capabilities. However, the design and debugging of hardware is a complex, expensive, and time consuming process. Hardware solutions are also inflexible. Should a new algorithm become known, the only way to implement it is to build a new hardware product. Thus, the hardware solution lacks the flexibility needed to respond to changing conditions. In addition, hardware solutions generally are only available to provide processing capability to graphics processing tasks. For non graphics processing tasks, additional processing capabilities are required, adding to the expense of a graphics processing system.

Prior art software solutions provide a programming language that can be executed on a general purpose processing system. Rendering commands from a program drawing to the display are interpreted and executed in software. Software solutions are more flexible that hardware solutions in that new algorithms and techniques can be implemented by writing new software, which is easier than designing and building new hardware. However, existing software solutions also suffer from a number of disadvantages.

One prior art software problem is instruction execution latency. Many graphics algorithms consists of a small number of reduced instruction set computing (RISC) single instruction, multiple data (SIMD) instructions (a few dozen instructions or less). The instructions may be independent or dependent. A dependent instruction is an instruction that contains operand dependencies, that is the source operands of one instruction are the result operands of a prior instruction. For example, a typical quadratic polynomial $d=ax^{**}2+bx+c$ might be coded as $e=x*a+b$ $d=x*e+c$ Since the result (e) of the first instruction is a source (e) in the second instruction, the second instruction cannot be executed until completion of the first instruction, creating an operand dependency. If the pipeline latency is, for example, 7 clocks, the second instruction could not begin until 7 clocks had transpired, which is very inefficient (15% of peak throughput).

There are several approaches to alleviating this problem. One is the scheduling of independent instructions between the dependent instructions, so that processing continues even when a dependent instruction is waiting for data. This requires optimizing of the execution of the program by a programmer or by an optimizing compiler. Requiring the programmer to optimize during development is a complex task. An optimizing compiler is difficult to write and may not always optimize.

Another problem is that with many short graphics programs there are often not enough independent instructions to schedule. If there are no independent instructions to execute, the processor is idle, reducing efficiency.

Another attempt to optimize software execution of graphics commands is to interleave instructions from multiple vertices and pixels, such as different loop passes. This is even more complex than prescheduling, and leads to inefficiencies when modes change.

Another approach is to shorten the pipeline latency, or pipeline bypassing (so that operands still in the pipeline can be used by other instructions before being written back to the registers). Both of these solutions require complex hardware to control and route all the operands in the pipeline, and is of benefit only when operations can execute in a single clock cycle. Operations that take multiple clocks, such as floating point multiply and add, are not optimized since the partial results within them cannot be bypassed to other instructions.

Software solutions also suffer from conditional execution. When a program executes a conditional branch dependent on the results of a previous instruction, the next instruction cannot begin execution until the result is computed, inefficiently waiting up to the depth of the pipeline. There are several approaches to alleviating this problem. Results in the pipeline can be bypassed to the branch control, or the pipeline depth can be shortened, with similar hardware complexities to operand dependency above. Another approach is branch delay slots, in which several instructions following the branch instruction are executed, which leads to software complexity in scheduling those instructions, especially in short graphics programs.

Another approach is speculative execution and/or branch prediction of instructions after the branch and/or at the branch target, executing the branch whether needed or not. This leads to inefficiencies when the speculative or predicted instructions are not needed.

SUMMARY OF THE INVENTION

The present invention provides efficient graphics processing in a software environment by interleaving of graphics processing instructions. The invention provides an execution pipeline and a number of registers. Each register holds instructions from a separate program. (The definition of "program" here is an operation performed on data. For example, the same operation on different data is treated as two programs, different operations on the same data represent two programs, or different operations on different data are two programs.)

Instructions from the registers are interleaved in the execution pipeline such that the average latency is one instruction per cycle. This is accomplished even when there is conditional branching and execution latency. When one instruction of a program has a dependency based on execution of a previous instruction, that second instruction is not provided to the execution pipeline until completion of the first instruction. In the meantime, interleaved instructions from other programs are still being executed while the first instruction of the first program is executing. Thus the pipeline is always full and the processor is always working at peak capacity.

The automatic interleaving of instructions permits simplified graphics software routines to be written. There is no need for the programmer or developer to anticipate or attempt to eliminate conditional branching or to worry about instruction latency. The programmable interleaved graphics processing system of the invention provides a solution to those problems.

DETAILED DESCRIPTION OF THE INVENTION

A method and apparatus for interleaved graphics processing is described. In the following description, numerous specific details are set forth in order to provide a more detailed description of the invention. It will be apparent, however, to one skilled in the art, that the present invention may be practiced without these specific details. In other instances, well known details have not been provided so as to not unnecessarily obscure the invention.

The processing of three dimensional graphics is characterized by large amounts of processing. Graphics processors can process tens of millions of vertices and geometric primitives, and hundreds of millions of pixels per second. Because there is so much processing, any delay or inefficiency in program execution is harmful, and can be propagated very rapidly. But, because there is so much processing, with many of the tasks being independent from other tasks, there is the opportunity to continue processing other tasks when one task must be delayed.

This invention takes advantage of the large amount of processing inherent in graphics processing by interleaving the programs for several vertices, primitives, pixels, or other graphical elements in a processing pipeline. In other words, at each clock cycle, a different one of the programs is executing its instructions. When a program is waiting for the results of a first instruction for data needed in a second instruction, the processor is not idle, it is executing instructions of other programs. When the number of programs equal to or greater than the depth of the processing pipeline is executing, the apparent instruction latency in each program can be as little as one instruction. Consider where there are four programs each with five instructions. Using interleaving, the four programs finish execution in twenty clock cycles, giving an average latency of one instruction per clock cycle. Using the invention, the results of an instruction in a program are available as sources to the next instruction in that program, without the hardware complexity of pipeline bypasses, the software complexity of instruction reordering, or the inefficiency of idle cycles. This results in a simple software programming model at low hardware cost and high efficiency.

For interleaved processing, the storage elements (registers) and program counters (PC) are unique for each program. There are as many copies of registers and PCs as there are programs executing. In one embodiment, there are as many programs executing as the depth of the instruction execution pipeline between an arithmetic result and source dependency, or a load source address and data dependency, or a branch source condition and the target instruction fetch. If branch instructions include Call and Return instructions then a PC stack per program is also required.

Since only one instruction or instruction group is fetched per program per cycle, a single shared instruction memory or cache can be used, and since only one load/store instruction or group accesses data memory per cycle, a single shared data memory or cache can be used.

An advantage of the invention is that since mode changes (program or data changes that affect the processing of a graphical element) are frequent in graphics applications, each program executes independently on the program and data of its own element Each element's mode is independent, and modes can be changed per element without performance degradation.

If data sharing between programs is required, the invention can be extended to include external synchronization mechanisms, such as stalling execution at specific instruction or data addresses, or internal synchronization mechanisms such as conditional branches on the state of other programs.

For example, a typical graphics processor pipeline might consist of seven execution stages (although the number of execution stages in practice varies widely with frequency, device characteristics, and instruction set.) As an example, three general types of instructions which are latency sensitive are shown. One is an arithmetic instruction such as a floating point multiply add $$D=A*B+C;$$

with a three cycle float multiply add operation. Another is a conditional branch instruction based on a register value less than zero, a decrement of that register, and a branch target with a register offset from the current PC.

if (A--<0) goto (PC+B);

where PC is the program counter. A third is a load instruction from a local memory at a computed address $$D=*(A+B);$$

The following types are fairly representative of general RISC instructions.

|   | Arithmetic | Branch | Load |
|---|---|---|---|
| 1 | Source Fetch | Source Fetch | Source Fetch |
| 2 | Operand Route | Operand Route | Operand Route |
| 3 | Madd A | Compare | Address Add |
| 4 | Madd B | Add PC, Dec Operand | Address Route |
| 5 | Madd C | Instruction Fetch | Memory Access |
| 6 | Result Route | Instruction Decode | Data Route |
| 7 | Destination write | Destination write | Destination write |

Memory store instructions are similar to loads, except the store data is a source operand fetch and no destination route and write occurs, so stores are typically not latency sensitive. Subroutine calls and returns are similar to branches, with the read or write of a PC stack with the previous or target PC.

With the seven cycles of pipeline latency shown in the example, consider where programs for seven graphics primitives are executing interleaved in the pipeline. With the arithmetic instruction as an example, the program execution of 7 programs 0-6 would interleave like the following over clocks 1 to 8.

| 1 | SF0 |     |     |     |     |     |     |
|---|-----|-----|-----|-----|-----|-----|-----|
| 2 | SF1 | OR0 |     |     |     |     |     |
| 3 | SF2 | OR1 | MA0 |     |     |     |     |
| 4 | SF3 | OR2 | MA1 | MB0 |     |     |     |
| 5 | SF4 | OR3 | MA2 | MB1 | MC0 |     |     |
| 6 | SF5 | OR4 | MA3 | MB2 | MC1 | RR0 |     |
| 7 | SF6 | OR5 | MA4 | MB3 | MC2 | RR1 | DW0 |
| 8 | SF0 |     |     |     |     |     |     |

The source fetch of program 0 (SF0) occurs at clock 1. At clock 2, the source fetch of program 1 (SF1) is executed, along with the operand route step of program 0 (OR0). At each clock, the source fetch of each succeeding program is placed in the pipeline, while earlier programs continue execution. The result is such that in the 8th clock the next instruction of program 0 begins execution, and the result of the previous instruction in that program, or the load data or branch target location of that program, is available to that instruction. The functional latency of the instructions visible to the program and programmer or compiler is one instruction, even though the hardware pipeline latency of the instruction is many more. (Note that without interleaving, the subsequent instructions of program 0 would immediately follow the first instruction of program 0, but would need to stall at some point to wait for dependent data, creating pipeline inefficiencies.)

Figure 1:
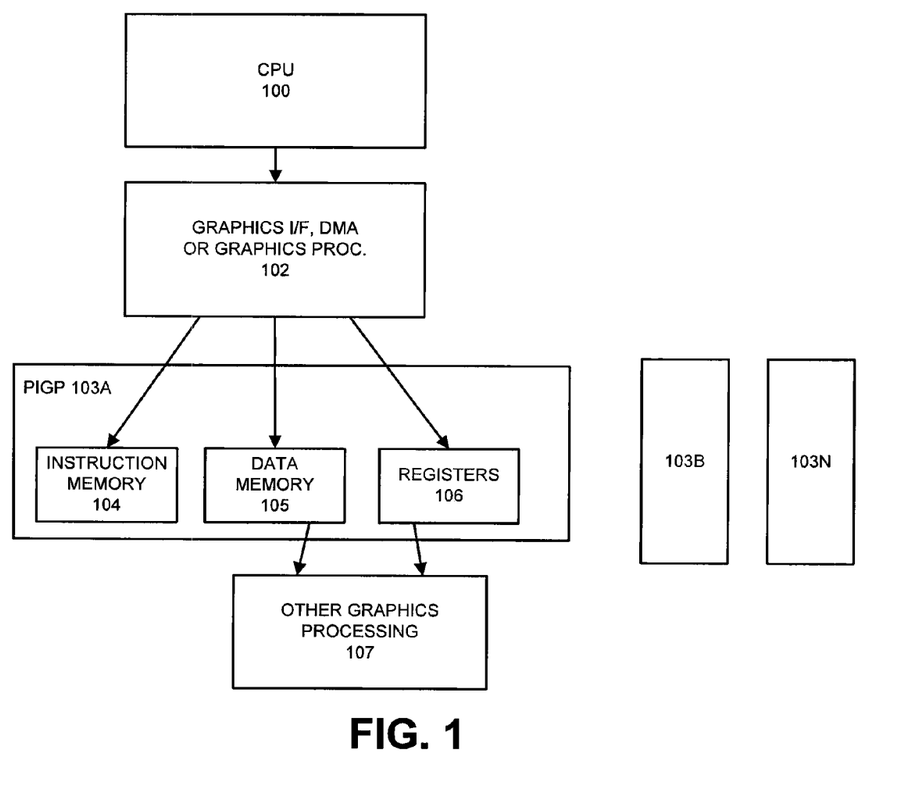
FIG. 1 is a block diagram of a system for implementing the present invention.

The interleaved graphics processor of the present invention may be part of a larger graphics pipeline. Referring to FIG. 1, a programmable interleaved graphics processor 103A includes registers 106, data memories 105, and/or instruction memory 104. These may be written with graphics data by a general purpose CPU 100 by means of a command processor or other interface or by DMA from memory (102). Some output registers may input data and commands to further hardwired graphics processing such as polygon rasterization, texturing, or framebuffer blending and Z buffering, or a subsequent programmable graphics processor 107. Parallelism can be provided by providing multiple programmable interleaved graphics processors (PGIPs) 103B through 103N.

Figure 2:
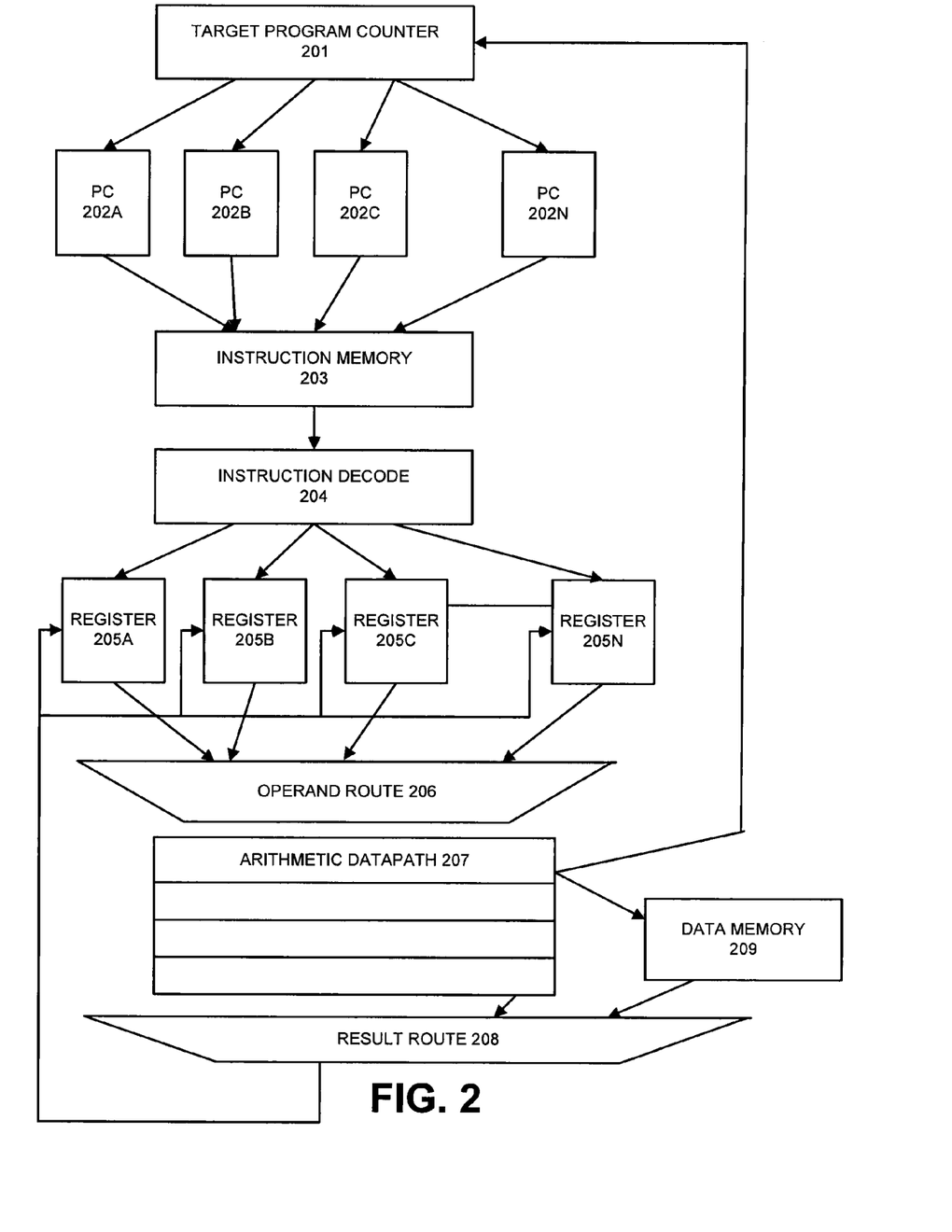
FIG. 2 is an example embodiment of the programmable interleaved graphics processor of the present invention.

An example embodiment of the programmable interleaved graphics processor is shown in FIG. 2. A target program counter 201 is coupled to a plurality of program counters 202A through 202N. The number of program counters (PCs) should match the number of programs that are being interleaved at one time. (e.g. seven in the above example). The program counters are coupled to instruction memory 203. Instructions from instruction memory 203 are provided to instruction decode 204 and then to an appropriate one of registers 205A through 205N. There are as many registers as there are programs being interleaved (and ideally, as many programs as stages in the processing pipeline).

The registers 205A through 205N are coupled to operand route 206. The output of operand route 206 is coupled to the arithmetic datapath 207. Data memory 209 and output from datapath 207 are provided to result route 208. The output of result route 208 is made available to multiple registers 205A through 205N.

In graphics processing, the graphical elements that are being processed are known by the CPU. Each element includes its processing mode, that is, which program is being applied to the element. The interleaving process queues up a number of programs appropriate for the size of the pipeline. The program counters and registers are assigned to each program and one instruction for each program is routed into the pipeline clock. A typical three dimensional graphic scene can have hundreds of thousands of programs available for batching in a group for interleaving.

Figure 3:
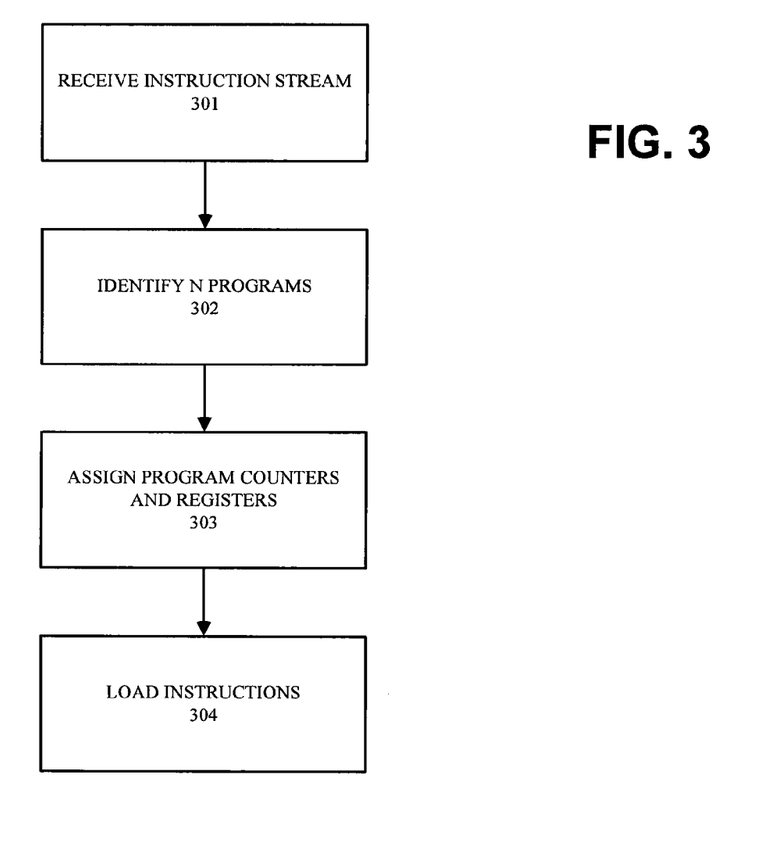
FIG. 3 illustrates a flow diagram of one embodiment of an interleaver for use with the present invention.

FIG. 3 illustrates a flow diagram of one embodiment of an interleaver for use with the present invention. At step 301 an instruction stream is received, with each instruction consisting of a program and data to be used by a graphical element. At step 302 the interleaver identifies N programs where N is the depth of the pipeline. (Note that in some circumstances, the number of programs identified could be less than N).

At step 303 the interleaver assigns program counters and registers to the N selected programs. At step 304 the instructions from those programs are loaded as appropriate in the instruction stream of the graphics processor.

Loads

The present invention could also support loads because the latency of loads is approximately the same as register latency. With a cache, load latency on a cache hit would fall in line with vertex batching quite well (6 clock fetch, mux, add, mux, read, mux, writeback/bypass). However cache misses might have long latency. A solution would be a register dependency checking, renaming, etc. Another solution is to have the batch (or the thread) stall on a miss. A prefetch variant of load could be supported to hide miss latency. Since load destination could be only temp, it is possible to keep a list of load targets (for each thread), and compare each of 3 sources to each pending load, and stall on collision or the Nth pending load. Since only two temp even and two temp odd sources (from a vector/scalar pair) are possible in each cycle, another scheme is to keep a 1 b tag per temp register (dual port or two copies) with one bit per thread, where the bit is set on load, cleared on write, and read by pending instructions that stall if the bit is set. A 2 or 4 by 16 by 6-8 bit load use tag ram may be cheaper than the compares of pending loads by 4 accesses by 4 b registers, and allows unlimited pending loads.

The invention also can operate efficiently when no-ops (no operations) may be required. For example, in rasterizing, the order of data delivery is important. This may require the insertion of no-ops into the instruction stream or retard the launching of new programs until the first program finishes. The invention provides a solution by reserving space in an output buffer where data can be placed in the buffer out of order. The programs are pre-sorted in the desired order, with spaces in the output buffer reserved for each program. Thus, even if a program finishes early, before a previously issued program, its output is stored in the correct location in the output buffer, with the output buffer not accessed until a collection of "in-order" data is available.

In this situation, no new programs are started until an output buffer for each new program is available. This requires inserting no-ops in the instruction stream for this condition.

Figure 4:
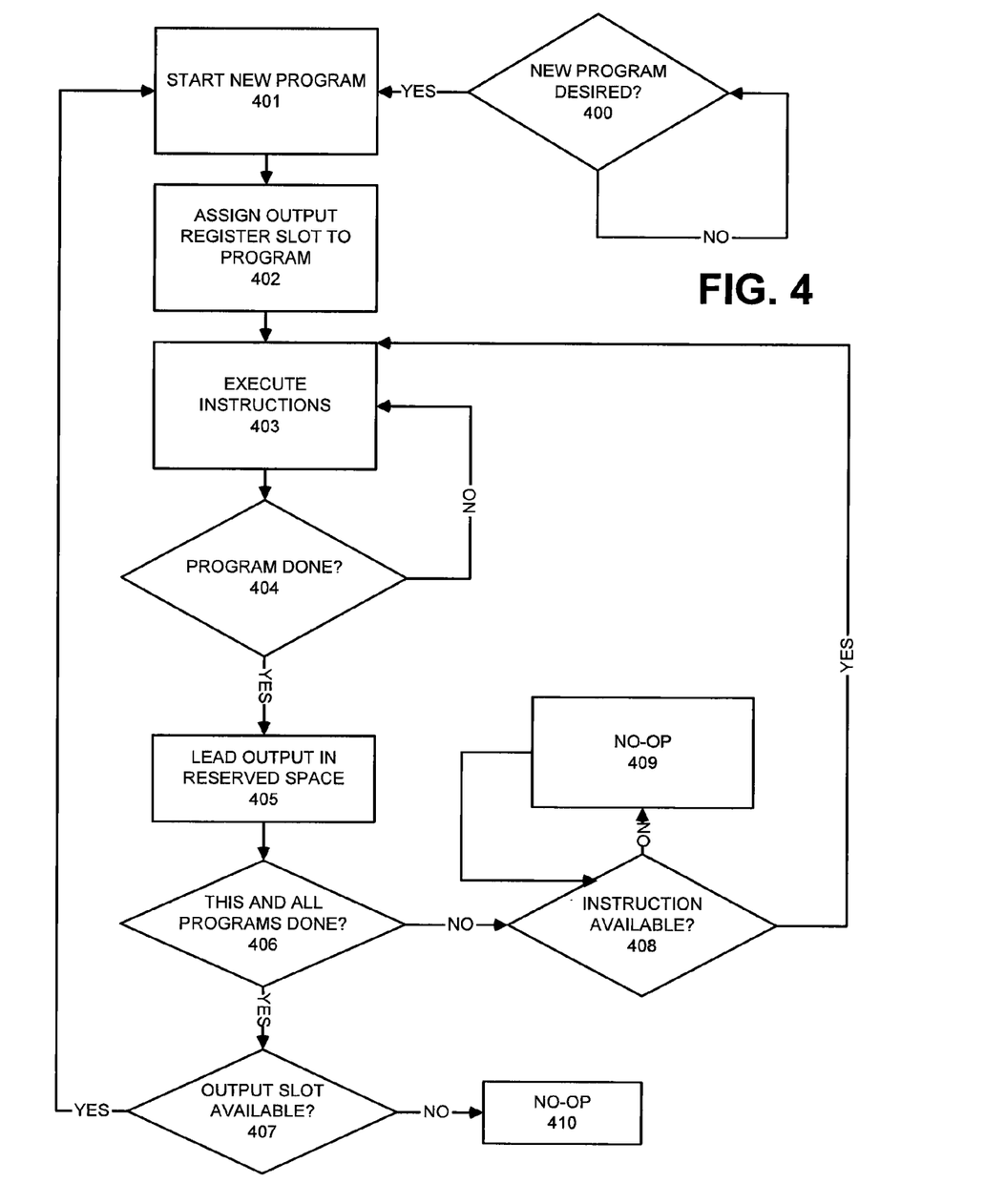
FIG. 4 illustrates the operation of the system for a set of programs where order is important.

FIG. 4 illustrates the operation of the system for a set of programs where order is important. At decision block 400 it is determined if a new program is desired. If not, the system loops, if so, the system proceeds to step 401. At step 401, the new program is started. At step 402, output slots are assigned to the program to provide the appropriate order. At step 403, an instruction is executed. At decision block 404 it is determined if one of the programs is done. If so, the output of the program is loaded into its reserved space at step 405. If a program is not done at decision block 404, the system returns to step 403 to execute the next instruction.

After the output of a completed program is loaded into the appropriate reserved register at step 405, decision block 406 determines if this program and all of the programs of the current set are complete. If all of the programs have not completed, the system looks for the next instruction. At decision block 408 it is determined if an instruction is available, that is, for a program that has not yet finished execution. If there is an instruction available, the system returns to step 403 to execute the next instruction. If there is no instruction available at decision block 408, the system no-ops at step 409 and returns to block 408.

If all of the programs are complete at decision block 406, the system proceeds to decision block 407 to determine if an output slot is available. If not, the system no-ops at step 410. If a slot is available, the system returns to step 401 and starts a new program.

As noted above, one embodiment of the invention includes a number of copies of registers at least equal to the number of interleaved programs, but a number of registers greater than the number of programs may also be used for system throughput optimization. With a larger number of copies of registers than the number of interleaved programs, some copies can operate as multiple input buffers and some copies can operate as multiple output buffers.

With multibuffered input, another system component, such as a CPU command interface or a memory command DMA unit or a rasterization and texturing unit, can write input registers with data for subsequent programs in parallel with current interleaved program execution. With multibuffered output, another system component, such as setup and rasterization unit or a framebuffer blending and Z buffering unit, can read output registers from previous completed programs in parallel with current interleaved program execution.

With multibuffered input and output registers, continuous program execution can occur without idle cycles lost waiting for input or output data. In one embodiment, a new interleaved program begins execution whenever a valid input data register copy is available after having been written by another system unit, and when an output data register copy is free after having been read by another system unit.

One embodiment of the invention also includes instruction memory larger than that needed to hold all the programs being executed by the current interleaved programs, and data memory larger than that needed to hold the data set accessed by all current interleaved programs. With larger instruction and data memories, other system units can update the contents of these memories at locations not used by currently executing interleaved programs so that subsequent interleaved programs can begin execution without waiting for instruction or data memory updates from other system components.

In one embodiment, the input and output registers are double buffered, containing twice as many copies of input and output registers as the number of executing interleaved programs, and the instruction and data memories are also double buffered, containing twice as much instructions or data as are accessed by the executing interleaved programs.

In addition to typical microprocessor types of instruction sets which are well known, such as arithmetic, logical, load store, and branch, the programmable interleaved graphics processor instruction in one embodiment contains compound instructions such as are appropriate for performing common but complicated graphics operations. These compound instructions may perform several arithmetic, logical, and memory access operations.

A frequently useful compound instruction is a texture sample instruction, in which the processor supplies a texture coordinate to a texturing system component, and the component returns a filtered texture image sample at that coordinate. Other possibly useful compound instructions include a surface evaluation instruction, which returns a surface sample from a surface parameter or coordinate, and a visibility evaluation instruction, which returns a visibility status or coverage from an image depth coordinate.

The graphics processor instruction set may also be enhanced with complex instructions to perform common graphical algorithms (instead of performing those algorithms in a number of simpler instructions) such as matrix multiply, vector normalization, trigonometric functions, and exponentiation. Both compound and complex instructions can offer advantages in requiring fewer instructions to be accessed and providing higher performance than can be achieved with simpler instructions, at the cost of potentially larger and more complex implementations, and greater difficulty in programming or compiling compound or complex instructions.

In one embodiment, complex and compound instructions can have longer latency to each interleaved program than that of single instructions, in order to allow more cycles for the complex and compound operations to occur. Another advantage of the invention is that since simple instructions in each interleaved program have the pipeline latency number of cycles to complete, such as 7 cycles, then compound and complex instructions with longer latency can have many more cycles to complete. For example a compound texture sampling instruction with latency 2 has 14 cycles or latency 3 has 21 cycles, as is typically needed to perform the compound or complex computation. In one embodiment, complex or compound instructions would be implemented in pipelined units, so that instructions from interleaved programs can issued to those units in each cycle.

For graphical element processing, SIMD vector operands are often length four, such as XYZW coordinates and RGBA colors. Frequently however, scalar operations are needed, and frequently vector operands are of length three, such as XYX coordinates, XYZ vectors, and RGB colors. A datapath which supports SIMD vector length of four will be underutilized for lengths of three and one. A significant performance enhancement for graphical element processing can be achieved with an instruction set which includes SIMD vector operands of length 4, and paired instructions of length 3 vector operation and length 1 scalar operation which execute in parallel. With a variable instruction issue variable SIMD vector length instruction set, high utilization of a SIMD datapath can be maintained over the range of typical graphics algorithms.

Figure 5:
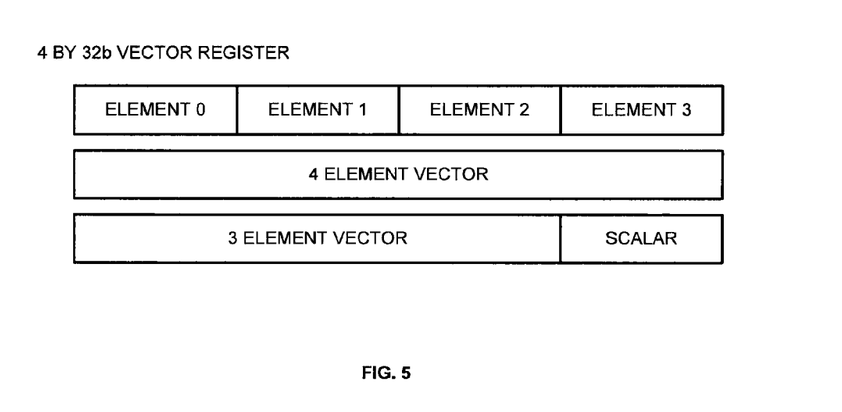
FIG. 5 illustrates the organization of a register file.

The vector organization of a register file is illustrated in FIG. 5. The 4×32 b register is divided into four elements, element 0, element 1, element 2, and element 3. The register can store a four element vector, V4, or a 3 element vector, V3, (in elements 0, 1, and 2) with a 1 length scalar in element 3.

A V4 instruction executes alone. A V3/scalar pair of instructions executes in parallel. A V4 instruction can have the functionality of a single V3 or scalar instruction by means of a dest write mask, (with the exception of the distinction between dot4 and dot3 instruction, where the dot3 only sums vector element products 0, 1, 2, and dot4 sums all four). For peak throughput cases, a pair can also consist of a vector operation and a special vector move, as long as source and destination banks don't conflict.

The difference between vector4 and pair vector3/scalar pair instructions is that vector instructions operate on all 4 data paths, while pair instructions issue a scalar instruction on vector datapath 3, in parallel with a vector3 instruction operating on vector datapaths 012. Scalar instructions can select any source vector element, and propagate their scalar result across the dest vector written under the dest write mask.

Scalar and vector3 instructions in a pair can access the same vector elements, as long as the register types and register address don't conflict. This hazard is a software dependency. If a pair accesses the same type at a different address, or writes the same element of the same type, results are undefined in hardware. The hardware can be designed to select register addresses per element per type, so that pair instructions can access the same register type at different addresses for different elements. Element address conflicts can be detected at assembly time.

The invention can make the variable length instruction combinations by looking ahead in the instruction stream. If an instruction is less than length 4, and there is another instructions further back that can execute concurrently and can be combined to be length 4 or less, then the combination is made. The instruction decode should have an additional port or ports to handle possible instruction combinations.

Figure 6:
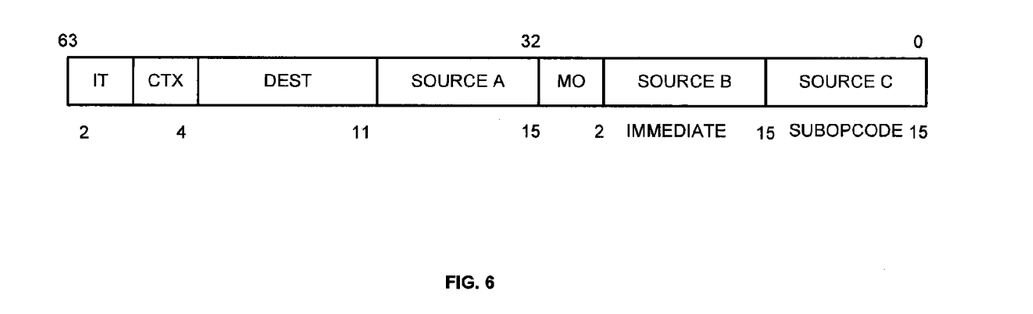
FIG. 6 is an example of an instruction format.

One example of an instruction format is illustrated in FIG. 6. It is 64 bits, with bits 63-62 being an IT (instruction type) field. Bits 61-58 are the context base register followed by an 11 bit destination field. There are three 15 bit source fields, (source A, source B, and source C) with a 2 bit major opcode field (MO) between source A and source B. The IT instruction type and MO major opcode fields are split for easier packing of 32 b words. Since the only 4 operand instruction, madd, is identified in the MO field, the sourceC field is overloaded to supply up to 15 b of subopcode for 2 and 3 operand instructions. The sourceB field is overloaded to provide a 15 b immediate value for control instructions (branch, call) or an offset for potential load instructions. The dot opcodes can be put into the MO field for quicker decoding of latency 2 instructions, but if this isn't needed then dot could be a 3 opcode instruction.

One embodiment of a variable length SIMD instruction set would have MO field identify instructions as 4 element, 3 element, and 1 element SIMD instructions. All instruction types would be available for each element length. An embodiment with 4 datapath units would then execute one 4 element instruction per clock, or a pair of two instructions consisting of one 3 element instruction and one 1 element instruction.

Alternate Dot Encoding

Since there is sufficient opcode space, an alternative to a dot3/4 instruction is to allow mul and add arithmetic operation to include a Sum subfield. Sum would defer the destination write by one clock until the sum of the datapath results is computed. Then it would be possible to include a 4 bit datapath sum enable bit field, so that any 2 to 4 results could be summed. For example, addsum could then support the summation of 8 operands.

Stream Commands

A number of new stream commands are available to support the programmable graphics processor, including Goto: begin execution of PIGP program at IM location in the command for the next vertex End: terminate the current vertex batch and begin PIGP processing Flush: complete execution of all PIGP vertex batches IMload: write N stream words to IM at IM location in the command CTXload: write N stream words to CTX at CTX location in the command The IM and CTX loads could also have DMA versions. A load of IM which overwrites an executing PIGP location would be proceeded by a flush. A load of CTX which overwrites an CTX location in use by a PIGP program could be proceeded by a flush.

For higher performance than can be achieved in one programmable interleaved graphics processor, several such processors may be arranged in parallel as suggested in FIG. 1. The number of graphics programs independently operating on graphics elements can then be the pipelined depth of each processor times the number of processors, and the performance can be the multiple of the number of processors. The upper limit of performance will then be the hardware cost limitations, the number of graphical elements which can be processed simultaneously, the performance of other system components such as CPU or memory, and/or synchronization boundaries between the processing of elements. However unlike other parallel approaches in prior art, the upper limit of performance is not the number of elements which can be processed identically in parallel, because of the independent program and data per element support of a programmable interleaved graphics processor.

A number of other applications can benefit from programmable processing with low latency instruction execution, and contain a sufficient number of independent data elements such as can be readily interleaved for processing. Examples include audio, video, image and digital signal processing, and physical modeling and simulation.

The synchronization of input and output data of the programmable processor with other system elements can be external, by stalling execution and modifying registers and PCs based on external events, or internal, based on conditional branches on external state variables. Some programmable graphics processors may implement only a subset of possible instructions, such as only arithmetic and not branch or load or store instructions. Some processors may vary instruction set architectures between floating point, integer, and fixed point, single and multiple instruction issue, scalar or SIMD with various vector lengths appropriate for the graphical element and program.

One embodiment of the invention include a vertex geometry processor, in which the processor inputs are the vertex command stream from a graphics command processor, the outputs are to the rasterization pipeline, and the instruction set supports float SIMD. Another embodiment is a pixel shading processor, in which the inputs are textured and shading pixels from a graphics texturing pipeline, the outputs are to the framebuffer blending and Z buffering pipeline, and the instruction set supports fixed point SIMD.

I claim:

1. A programmable processor for executing a plurality of programs, said programmable processor comprising:
 a target program counter coupled to a plurality of program counters, said target program counter for determining a number of programs to interleave from a plurality of programs that is greater than the number of program counters;
 each of said plurality of program counters coupled to an instruction memory;
 instructions from said instruction memory coupled to an instruction decode;
 said decode coupled to a plurality of registers;
 each of said plurality of registers coupled to an operand route;
 said operand route coupled to an arithmetic datapath;
 said datapath and an output of a data memory coupled to a result route; and
 an output of said result route fed back to each of said plurality of registers.

2. The programmable processor of claim 1 wherein said plurality of program counters is equal to said plurality of programs to be interleaved.

3. The programmable processor of claim 1 wherein said plurality of registers is equal to said plurality of programs to be interleaved.

4. The programmable processor of claim 1 wherein said plurality of registers is more than said plurality of programs to be interleaved.

5. The programmable processor of claim 1 wherein said instruction memory is larger than needed to hold said plurality of programs.

6. The programmable processor of claim 1 wherein said data memory is larger than needed to hold a data set accessed by each of said plurality of programs.

7. The programmable processor of claim 1 wherein each of said plurality of registers is double buffered and contains twice as many copies of registers as said plurality of programs.

* * * * *